United States Patent [19]

Dewey et al.

[11] Patent Number: 5,790,372
[45] Date of Patent: Aug. 4, 1998

[54] COMPUTER POWER SUPPLY MOUNTING APPARATUS AND METHOD

[75] Inventors: Doug Dewey, Pflugerville; Timothy Radloff; Erica Scholder, both of Austin, all of Tex.

[73] Assignee: Dell USA, L.P., Round Rock, Tex.

[21] Appl. No.: 788,671

[22] Filed: Jan. 24, 1997

[51] Int. Cl.$^6$ ............................... G06F 1/16; H05K 7/02
[52] U.S. Cl. ...................... 361/683; 361/727; 312/223.2
[58] Field of Search .................. 363/146; 312/223.2, 312/263; 403/353, 375; 364/708.1; 361/608, 609, 614, 683, 685, 724–727, 740, 747, 732

[56] References Cited

U.S. PATENT DOCUMENTS

| | | | |
|---|---|---|---|
| 2,871,457 | 1/1959 | Jencks et al. | 361/725 X |
| 4,448,465 | 5/1984 | Yonenaka | 361/608 X |
| 4,725,244 | 2/1988 | Chewning et al. | 361/683 X |
| 5,006,960 | 4/1991 | Kallin et al. | 361/724 |
| 5,121,296 | 6/1992 | Hsu | 361/685 |
| 5,124,885 | 6/1992 | Liu | 312/263 X |
| 5,132,876 | 7/1992 | Ma | 361/685 X |
| 5,138,525 | 8/1992 | Rodriguez . | |
| 5,164,886 | 11/1992 | Chang | 361/683 |
| 5,235,493 | 8/1993 | Yu | 361/685 |
| 5,325,262 | 6/1994 | Ma | 361/683 X |
| 5,523,917 | 6/1996 | Searby | 312/223.2 X |
| 5,564,804 | 10/1996 | Gonzalez et al. | 361/685 X |

*Primary Examiner*—Michael W. Phillips
*Attorney, Agent, or Firm*—Haynes and Boone, L.L.P.

[57] ABSTRACT

A computer, or other similar type of electronic device including a chassis, and a power supply mounted in the chassis is disclosed. One or more hooks are provided on one of the walls of the chassis and one or more corresponding walls of the power supply so that the power supply can be placed in the chassis and moved relative to the chassis to engage the hooks and secure the power supply in the chassis against movement in a first plane. A single screw is provided for engaging the chassis and the power supply for securing the power supply against movement in a plane perpendicular to the first plane. A tab on a wall of the chassis guides the power supply.

24 Claims, 3 Drawing Sheets

COMPUTER POWER SUPPLY MOUNTING APPARATUS AND METHOD

TECHNICAL FIELD

This invention relates generally to the field of computers, and other similar type of electronic devices, and, more particularly, to the mounting of a power supply in the computer chassis.

BACKGROUND

Many types of electronic devices, such as computers, include a power supply which is mounted in a housing or chassis along with the other circuits, components, and peripheral devices. Since the power supply receives alternating current electrical power and converts the alternating current to direct current for operating the various electrical components, safety regulations require that the power supply be completely enclosed in a case to prevent access to potentially harmful high voltages. As a result, power supplies are relatively heavy and bulky and, as such, present manufacturing and assembly production problems, along with problems accessing the power supply after it has been installed. For example, most power supplies are mounted to the chassis using several screws, making it difficult and time consuming to replace or remove the power supply for repair. Moreover, additional parts must often be added to the chassis to strengthen it so that it can support the power supply. Further, there are a number of bundles of wires that exit the power supply case and are routed to various components also located in the chassis. However, these wires often become tangled and create added bulk and can obstruct the installation of the cover for the chassis and/or the installation of peripheral devices, such as hard drives, CD ROMS, etc, in the chassis.

Therefore, what is needed is a power supply that is easily attached and removed from the chassis, does not require additional structural support and permits the wire bundles extending from the power supply to be neat and orderly, while taking up minimal space.

SUMMARY

A chassis having a bottom wall and at least one upright wall extending from the bottom wall, and a power supply mounted in the chassis is disclosed. One or more hooks are provided on at least one of the walls of the chassis and on at least one corresponding wall of the power supply so that the power supply can be placed in the chassis and moved relative to the chassis to engage the hooks and secure the power supply in the chassis against movement in a first plane. A single screw is provided for engaging the chassis and the power supply for securing the power supply against movement in a plane perpendicular to the first plane. The power supply housing is configured so that the cables extending therefrom do not interfere with installation of the chassis cover or any peripheral devices installed in the chassis.

Advantages are thus achieved because the power supply can be easily and quickly installed, serviced and replaced, yet does not require any additional structural support and permits the wire bundles extending from the power supply to be neat and orderly, while taking up minimal space.

BRIEF DESCRIPTION OF THE DRAWINGS

FIGS. 4 is a view similar to FIG. 2, but depicting the power supply fully installed in the chassis.

DETAILED DESCRIPTION OF THE PREFERRED EMBODIMENT

Figure 1:
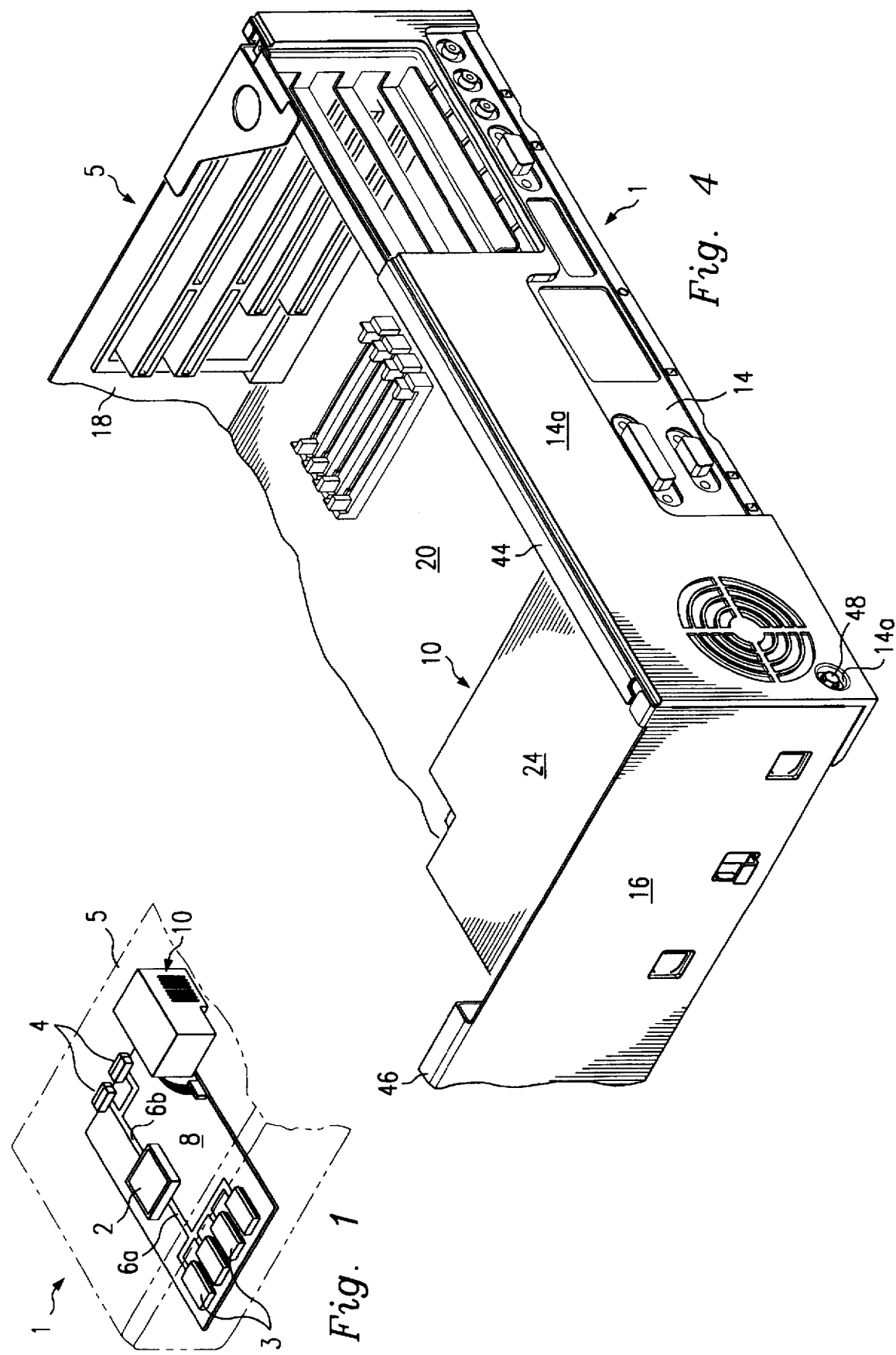
FIG. 1 is a schematic view of a computer according to an embodiment of the present invention.

The personal computer according to an embodiment of the present invention is shown schematically in FIG. 1 of the drawings by the reference numeral 1, and includes a processor 2, a memory device 3, and two input/output (110) devices 4, all contained within a chassis, or inner enclosure, 5. Two buses 6a and 6b are also disposed in the chassis 5 and connect the processor 2 to the memory device 3 and to the input/output devices 4, respectively. A mother board 8 is also provided in the chassis 5 for mounting and interconnecting various electrical circuits and related devices. A power supply 10 is mounted in the chassis 5 in a manner to be described and is also connected to the mother board 8. It is understood that other electrical traces (not shown) are provided for connecting the components of the computer 1.

Figure 2:
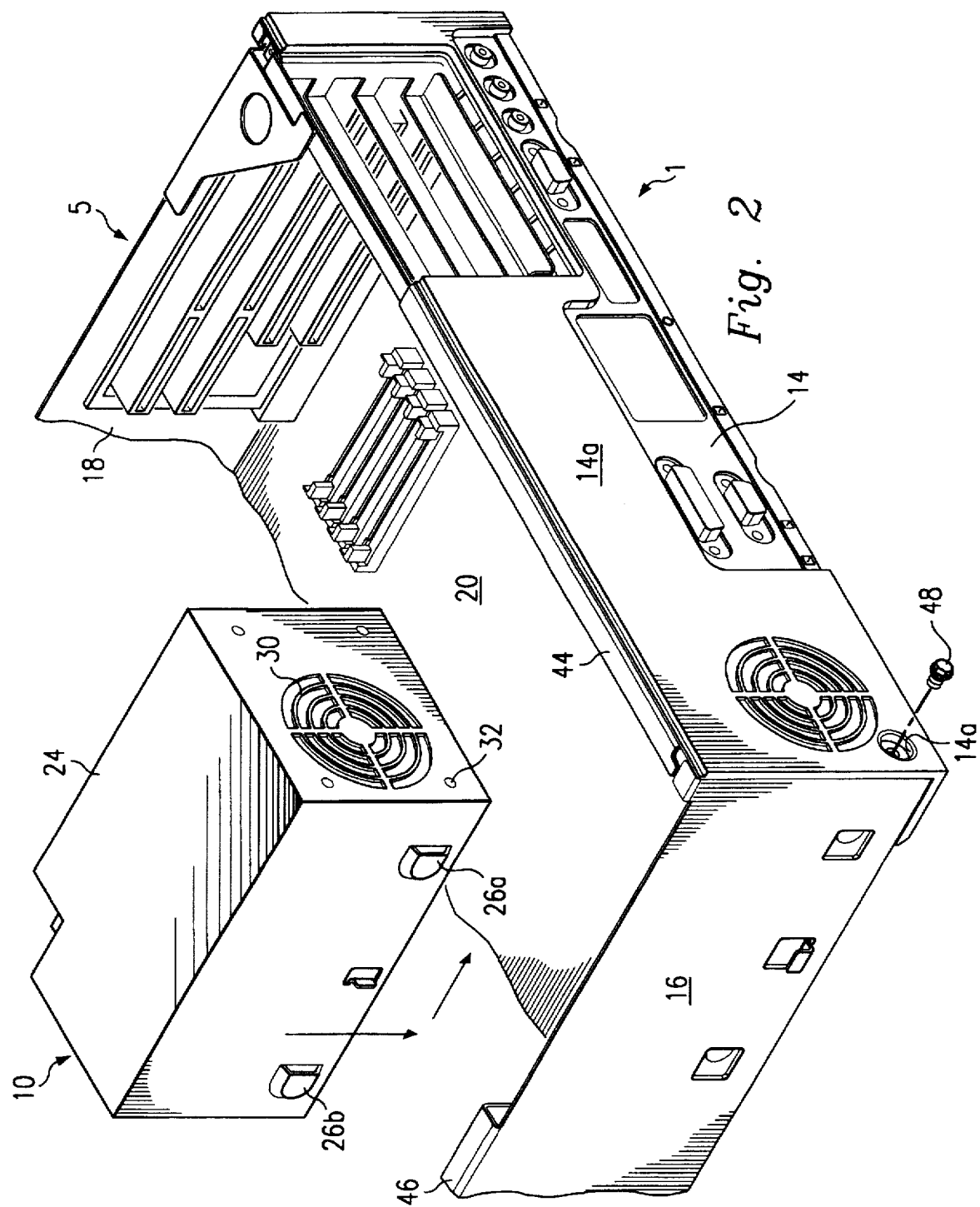
FIG. 2 is an exploded, rear isometric view of the power supply and the chassis of the computer of FIG. 1

Referring to FIG. 2, the chassis 5 is formed by a rear wall 14, two sidewalls 16 and 18, and a bottom wall, or floor, 20. A bezel 14a is attached to the wall 14 and, although not shown for the convenience of presentation, it is understood that additional portions of an outer enclosure, including a cover, extend over the chassis 5. The chassis 5 is normally fabricated from sheet metal and the outer enclosure, including the bezel 14a, from plastic.

The power supply 10 includes an outer case 24 formed of sheet metal which houses the various components and circuitry forming the power supply which are not shown since they do not, per se, form any part of the preferred embodiment. A pair of spaced locking hooks 26a and 26b are provided on a side wall of the case 24 and, as viewed in FIG. 3, a pair of spaced locking hooks 28a and 28b are provided on the bottom wall of the case 24. The hooks 26a, 26b, 28a, and 28b can be formed by cutting and bending the sheet metal forming the wall of the case 24 in a conventional manner. The rear wall of the case 24 includes an air grill 30 (FIG. 2) which permits the flow of air to and from the power supply components and circuits enclosed in the case. The rear wall of the case 24 is also provided with a threaded opening 32 which receives a screw (not shown in FIG. 3) which also extends through the opening 14a in the rear wall 14 of the chassis 5.

Figure 3:
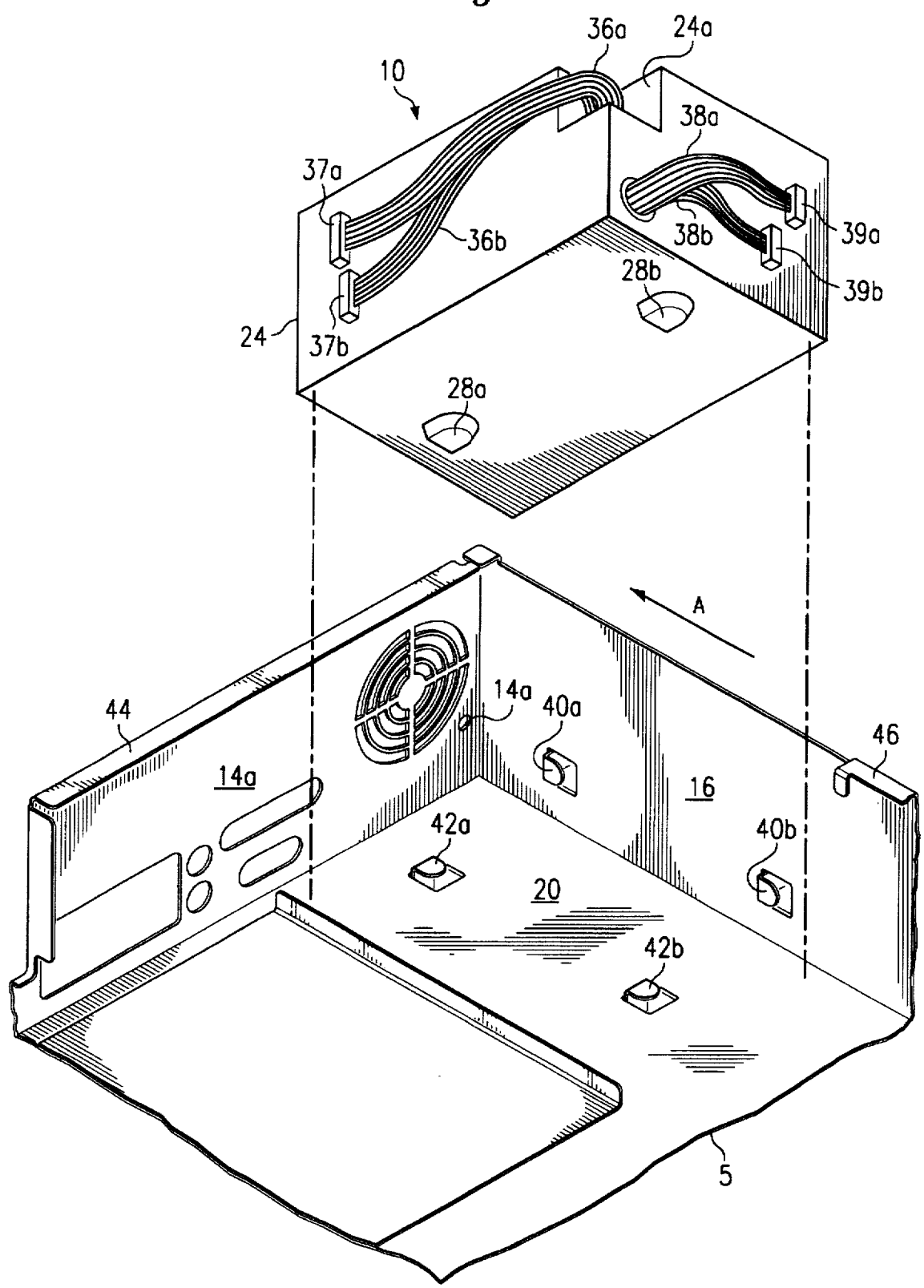
FIG. 3 is an exploded, front isometric view of the power supply and the chassis of one embodiment of the present invention.

As better shown in FIG. 3, a front corner of the case 24 is relieved as shown by the reference numeral 24a and an opening is formed in the relieved portion through which two wire bundles 36a and 36b extend. Two connectors 37a and 37b respectively extend on the exposed ends of the wires of the bundles 36a and 36b for connecting same to corresponding connectors associated with another component (not shown) located in the chassis 5. It is understood that one or more additional wire bundles can extend through the latter opening in the relieved portion 24a of the case 24. Since the wire bundles 36a and 36b extend from the relieved portion 24a of the case 24, the wires do not extend above the upper wall of the case 24 as viewed in FIG. 3, and thus do not interfere with the installation of the above-mentioned cover for the chassis 5, nor with any peripheral devices installed in the chassis. Similarly, two wire bundles 38a and 38b extend through the front wall of the case and two connectors 39a and 39b respectively extend on the exposed ends of the wires for connection to corresponding connectors associated with another component in the chassis 5. It is understood that one or more additional wire bundles can extend through the latter opening in the front wall of the case 24.

As also shown in FIG. 3, a pair of spaced hooks 40a and 40b are formed on the inner surface of the sidewall 16 of the chassis 5, and a pair of spaced hooks 42a and 42b are formed on the bottom wall 20 of the chassis The spacing between the hooks 40a and 40b are the same as the spacing between the hooks 26a and 26b (FIG. 2), and the spacing between the hooks 42a and 42b are the same as the spacing between the hooks 28a and 28b, respectively. The hooks 40a, 40b, 42a, and 42b can be formed by cutting and bending the sheet metal forming the chassis 5 in a conventional manner.

An inwardly projecting tab 44 is provided on the rear wall 14 of the chassis 5 and an inwardly-projecting tab 46 is provided on the sidewall 16, with the latter tab functioning to guide the power supply during its installation, as will be described. Also, as better shown in FIG. 2, an opening 14a is provided in the rear wall 14 for receiving a mounting screw 48.

To mount the power supply 10 in the chassis 5, the power supply is positioned above the chassis 5 as shown in FIGS. 2 and 3. The tab 44 guides and locates the power supply 10 as it is lowered until it rests on the bottom wall 20. The power supply 10 is then pushed in a direction indicated by the arrow A in FIG. 3 towards the rear wall 14 until the rear wall of the power supply passes underneath the tab 44 and engages the rear wall 14 of the chassis 5 as shown in FIG. 4. As a result of this latter movement, the hooks 26a and 26b (FIG. 2) on the sidewall of the case 24 engage the hooks 40a and 40b, respectively, on the sidewall 16 of the chassis 5. Similarly, the hooks 28a and 28b on the bottom wall of the case 24 engage the hooks 42a and 42b, respectively, on the bottom wall 20 of the chassis. The screw 48 (FIGS. 2 and 4) is then inserted through the opening 14a in the rear wall 14 and into the threaded opening 32 in the power supply case 24 to further secure the power supply 10 in the chassis 5 as shown in FIG. 3.

As a result of the above, the engaging hooks 26a, 26b, 28a, 28b, 40a, 40b, 42a, and 42b prevent any vertical movement of the power supply 10 relative to the chassis 5, as well as any lateral movement towards the center of the chassis; while the screw 48 prevents any lateral movement towards the front of the chassis. Thus, the power supply 10 is well secured in its assembled condition relative to the chassis as shown in FIG. 4. It is noted that the power supply 10 provides significant structural support for the corner area of the chassis 5 defined by the rear wall 14 and the sidewall 16. Further, the wire bundles 36 and 38 are not tangled but rather are neat and orderly and do not interfere with the installation of the chassis cover or any peripheral devices in the chassis 5.

To remove the power supply 10 from the chassis 5 for repair or replacement, the screw 48 is removed from the opening 32 in the case 24 and the power supply 10 is moved relative to the chassis 5 in a direction opposite the direction indicated by the arrow A, i.e., in a direction away from the rear wall 14. This disengages the hooks 26a and 26b from the hooks 40a and 46b, and the hooks 28a and 28b from the hooks 42a and 42b and, when the front wall of the case 24 hits the tab 46, the respective hooks are completely clear of each other. Then the power supply 10 can be lifted from the chassis 5.

For the convenience of presentation, several other components, circuits, and peripheral devices of the computer, including those shown in FIG. 1, are not shown in FIG. 2, since they do not form a part of the preferred embodiment of the present invention.

It is understood that variations may be made in the foregoing without departing from the scope of the invention as herein described. For example, the inventive concepts described herein are not limited to use with a computer as described above by means of example, but is equally applicable for mounting any electrical component. Also, the number of hooks, and the number of walls of the power supply and chassis on which the hooks are formed, can vary. Further, the power supply 10 can be secured against lateral movement relative to the chassis 5 by any type of fastener other than the screw 48.

It is also understood that the embodiment of the assembly described above is intended to illustrate rather than limit the invention, and that the mounting assembly can take many other forms and embodiments within the scope of the invention.

What is claimed is:

1. A computer comprising a chassis having a bottom wall, at least one upright wall extending from the bottom wall, a tab formed on one of the walls of the chassis, and at least one hook provided on one of the walls; and a power supply having at least one hook, whereby the power supply can be placed in the chassis and moved relative to the chassis to engage the hooks and secure the power supply in the chassis, the tab for guiding the power supply relative to the chassis during installation of the power supply to the chassis.

2. The computer of claim 1 further comprising two spaced hooks formed on one of the walls of the chassis and two spaced hooks formed on the power supply which respectively engage the hooks on the chassis.

3. The computer of claim 1 wherein the power supply and the chassis each has two sidewalls and a bottom wall, wherein there are two spaced hooks formed on a sidewall and on the bottom wall of the power supply, and wherein there are two spaced hooks formed on a sidewall and the bottom wall of the chassis; the hooks on the sidewall of the power supply respectively engaging the hooks on the sidewall of the chassis, and hooks on the bottom wall of the power supply respectively engaging the hooks on the bottom wall of the chassis.

4. The computer of claim 3 wherein the chassis has a rear wall and wherein the power supply engages the rear wall of the chassis in its secured position.

5. The computer of claim 4 further comprising a threaded opening formed in the power supply, an opening extending through the rear wall of the chassis, and a screw extending through the opening in the latter rear wall and in threaded engagement with the threaded opening, to further secure the power supply to the chassis.

6. The computer of claim 1 wherein a portion of the power supply is relieved and has an opening extending therethrough for receiving a wire bundle so that the bundle does not extend above the upper wall of the power supply.

7. The computer of claim 1 wherein the hooks secure the power supply against movement relative to the chassis in a first plane and further comprising means for securing the power supply against movement relative to the chassis in a plane perpendicular to the first plane.

8. The computer of claim 7 wherein the means comprises a screw extending through an opening in the chassis and in threaded engagement with the power supply.

9. A computer comprising a chassis having a bottom wall, at least one upright wall extending from the bottom wall, and at least one hook provided on one of the wall; and a power supply having at least one hook, whereby the power supply can be placed in the chassis and moved relative to the chassis to engage the hooks and secure the power supply in the chassis, the power supply and the chassis each having two sidewalls and a bottom wall, wherein there are two spaced hooks formed on a sidewall and on a bottom wall of the power supply, the hooks on the sidewall of the power supply respectively engaging the hooks on the sidewall of the chassis, and hooks on the bottom wall of the power supply respectively engaging the hooks on the bottom wall of the chassis, the computer further comprising a tab formed on a sidewall of the chassis to guide the power supply relative to the chassis during installation of the power supply to the chassis.

10. An electronic device comprising a chassis having a bottom wall, at least one upright wall extending from the bottom wall, a tab formed in one of the walls, and at least one hook provided on one of the walls; and a power supply having at least one hook, whereby the power supply can be placed in the chassis and moved relative to the chassis to engage the hooks and secure the power supply in the chassis, the tab for positioning the power supply relative to the chassis during installation of the power supply on the chassis.

11. The device of claim 10 further comprising two spaced hooks formed on one of the walls of the chassis and two spaced hooks formed on the power supply which respectively engage the hooks on the chassis.

12. The device of claim 10 wherein the power supply and the chassis each has two sidewalls and a bottom wall, wherein there are two spaced hooks formed on a sidewall and on the bottom wall of the power supply, and wherein there are two spaced hooks formed on a sidewall and the bottom wall of the chassis; the hooks on the sidewall of the power supply respectively engaging the hooks on the sidewall of the chassis, and hooks on the bottom wall of the power supply respectively engaging the hooks on the bottom wall of the chassis.

13. The device of claim 12 wherein the chassis has a rear wall and wherein the power supply engages the rear wall of the chassis in its secured position.

14. The device of claim 13 further comprising a threaded opening formed in the power supply, an opening extending through the rear wall of the chassis, and a screw extending through the opening in the latter rear wall and in threaded engagement with the threaded opening, to further secure the power supply to the chassis.

15. The device of claim 10 wherein a portion of the power supply is relieved and has an opening extending therethrough for receiving a wire bundle so that the bundle does not extend above the upper wall of the power supply.

16. The device of claim 10 wherein the hooks secure the power supply against movement relative to the chassis in a first plane and further comprising means for securing the power supply against movement relative to the chassis in a plane perpendicular to the first plane.

17. The device of claim 16 wherein the means comprises a screw extending through an opening in the chassis and in threaded engagement with the power supply.

18. An electronic device comprising a chassis having a bottom wall, at least one upright wall extending from the bottom wall, and at least one hook provided on one of the walls; and a power supply having at least one hook, whereby the power supply can be placed in the chassis and moved relative to the chassis to engage the hooks and secure the power supply in the chassis, wherein the power supply and the chassis each has two sidewalls and a bottom wall, wherein there are two spaced hooks formed on a sidewall and on the bottom wall of the power supply, and wherein there are two spaced hooks formed on a sidewall and the bottom wall of the chassis, the hooks on the sidewall of the power supply respectively engaging the hooks on the sidewall of the chassis, and hooks on the bottom wall of the power supply respectively engaging the hooks on the bottom wall of the chassis; the electronic device further comprising a tab formed on a sidewall of the chassis to guide the power supply relative to the chassis during installation of the power supply to the chassis.

19. A method of mounting a power supply to a chassis of an electronic device, the method comprising the steps of providing cooperating hooks on the power supply and the chassis, providing a tab on a sidewall of the chassis for guiding the power supply relative to the chassis during installation of the power supply on the chassis, positioning the power supply in the chassis and sliding the power supply relative to the chassis to engage the hooks and secure the power supply in the chassis.

20. The method of claim 19 wherein the hooks secure the power supply against movement relative to the chassis in one plane, and further comprising the step of securing the power supply against movement relative to the chassis in another plane perpendicular to the first plane.

21. A computer comprising a chassis, a power supply, at least one hook mounted on the chassis and the power supply for engaging to secure the power supply against movement relative to the chassis in a first plane, means for guiding the power supply relative to the chassis during installation of the power supply on the chassis, and means for securing the power supply against movement relative to the chassis in a plane perpendicular to the first plane.

22. The computer of claim 21 wherein the means for securing is a screw extending through an opening in the chassis and in threaded engagement with the power supply.

23. An electronic device comprising a chassis, a power supply, at least one hook mounted on the chassis and the power supply for engaging to secure the power supply against movement relative to the chassis in a first plane, means for guiding the power supply relative to the chassis during installation of the power supply within the chassis, and means for securing the power supply against movement relative to the chassis in a plane perpendicular to the first plane.

24. The device of claim 23 wherein the means for securing is a screw extending through an opening in the chassis and in threaded engagement with the power supply.

* * * * *